United States Patent
Nogami

(10) Patent No.: US 10,095,172 B2
(45) Date of Patent: Oct. 9, 2018

(54) INFORMATION PROCESSING APPARATUS, INFORMATION PROCESSING METHOD, AND RECORDING MEDIUM

(71) Applicant: CANON KABUSHIKI KAISHA, Tokyo (JP)

(72) Inventor: Atsushi Nogami, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/145,187

(22) Filed: May 3, 2016

(65) Prior Publication Data
US 2016/0334744 A1 Nov. 17, 2016

(30) Foreign Application Priority Data
May 14, 2015 (JP) ................................ 2015-099468

(51) Int. Cl.
*G03G 15/00* (2006.01)
*G06F 3/12* (2006.01)

(52) U.S. Cl.
CPC ......... *G03G 15/5079* (2013.01); *G03G 15/55* (2013.01); *G03G 15/553* (2013.01); *G06F 3/121* (2013.01); *G06F 3/1261* (2013.01); *G06F 3/1291* (2013.01); *G03G 2215/00021* (2013.01)

(58) Field of Classification Search
CPC ........ G03G 15/553; G03G 2215/00021; G06F 3/1203; G06F 3/1261
See application file for complete search history.

(56) References Cited

U.S. PATENT DOCUMENTS

| 5,995,721 | A | * | 11/1999 | Rourke | G06F 3/1203 358/1.13 |
| 8,823,993 | B2 | * | 9/2014 | Cudak | G06F 3/1296 358/1.1 |
| 2005/0068562 | A1 | * | 3/2005 | Ferlitsch | G06F 3/1208 358/1.14 |
| 2005/0134909 | A1 | * | 6/2005 | Shima | H04N 1/00278 358/1.15 |
| 2005/0270565 | A1 | * | 12/2005 | Shima | H04N 1/00915 358/1.15 |
| 2009/0180802 | A1 | * | 7/2009 | Sato | G03G 21/1821 399/119 |
| 2010/0265534 | A1 | * | 10/2010 | Prabhat | G06F 3/1205 358/1.15 |

(Continued)

FOREIGN PATENT DOCUMENTS

| JP | 2004094562 A | 3/2004 |
| JP | 2006021570 A | 1/2006 |

(Continued)

*Primary Examiner* — Sevan A Aydin
(74) *Attorney, Agent, or Firm* — Canon U.S.A., Inc. IP Division

(57) ABSTRACT

An information processing apparatus, which enables, when a plurality of apparatuses respectively having similar functions is used, respective maintenance costs required for the plurality of apparatuses to be reduced, predicts, for at least one of a plurality of parts in the plurality of apparatuses, a job amount that can be processed until the part becomes unable to operate normally, and a job amount to be input to the plurality of apparatuses until next maintenance work is performed, and determines a method for distributing the input job among the plurality of apparatuses based on a prediction result.

18 Claims, 10 Drawing Sheets

(56) References Cited

U.S. PATENT DOCUMENTS

2014/0063542 A1* 3/2014 Aoki .................... G06F 3/1296
358/1.15

FOREIGN PATENT DOCUMENTS

| JP | 2007004590 A | * | 1/2007 | ............ G06F 3/1211 |
| JP | 2007058544 A | * | 3/2007 | |
| JP | 2008070800 A | | 3/2008 | |
| JP | 2009282947 A | * | 12/2009 | ........... G03G 15/502 |

* cited by examiner

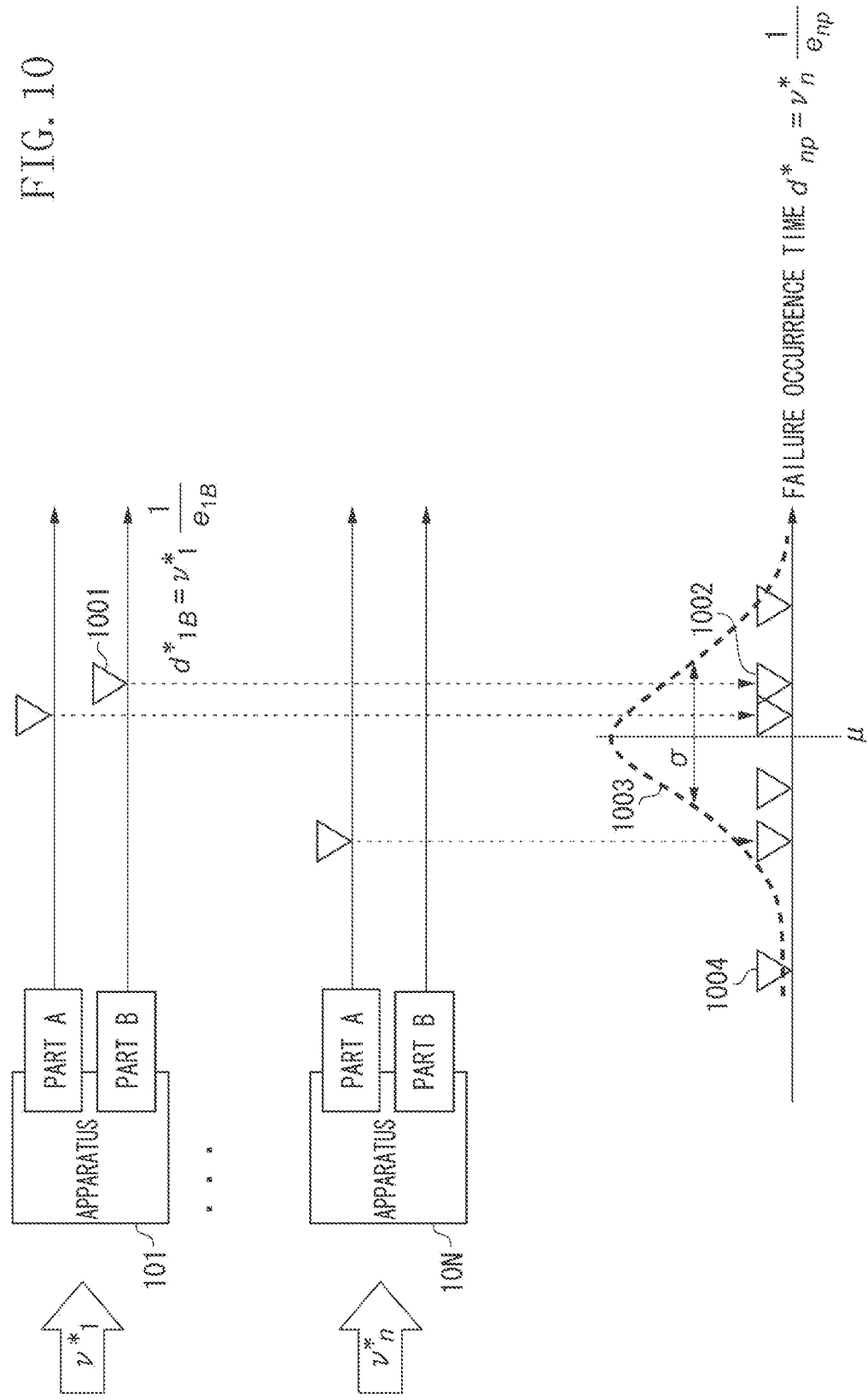

INFORMATION PROCESSING APPARATUS, INFORMATION PROCESSING METHOD, AND RECORDING MEDIUM

BACKGROUND OF THE INVENTION

Field of the Invention

The present invention relates to a technique for performing control to distribute a job among a plurality of apparatuses respectively having similar functions.

Description of the Related Art

In an apparatus such as an image forming apparatus, a service engineer visits a location where the apparatus is installed to perform maintenance work such as part replacement. The image forming apparatus to be a maintenance target is installed in various locations such as an office of each user. If the number of times of maintenance increases, the number of visits made by the service engineer and a traveling distance increase. Therefore, the number of times of maintenance is more preferably reduced by replacing a plurality of parts as collectively as possible than performing maintenance every time each of the parts needs to be repaired or replaced.

A technique for implementing maintenance work such as part replacement all at once is discussed in Japanese Patent Application Laid-Open No. 2006-21570. Japanese Patent Application Laid-Open No. 2006-21570 discusses a method for predicting an amount of degradation for each of a plurality of consumables used in an image forming apparatus and recommending the consumables that may be preferably replaced in a collective manner at a timing of next maintenance work depending on the predicted amount of degradation.

However, in the technique discussed in Japanese Patent Application Laid-Open No. 2006-21570, the consumable, which has been determined to be degraded, becomes a replacement target at the timing of the next maintenance work even if the number of times it can operate remains. In this manner, when the usable consumable is replaced, the remaining life of the consumable will be wasted. Therefore, a part cost corresponding to a remaining usable amount of the plurality of consumables is generated by merely replacing the consumables in a collective manner at the timing of the maintenance work.

If there is a consumable whose number of operable times is predicted to reach zero before the timing of the next maintenance work, the apparatus becomes unable to operate before the maintenance work so that downtime of the apparatus occurs. To avoid this, if the maintenance work is performed before a scheduled timing, a plurality of times of maintenance work, including scheduled maintenance work, is performed. Therefore, a visit cost of the service engineer rises, and a plan for the maintenance work needs to be reviewed.

In this manner, even if the life of a part such as a consumable is predicted, a maintenance cost such as a part cost or a visit cost is incurred as long as a timing at which the life of the part expires differs from a timing of maintenance work.

Similarly, in a case where a plurality of image forming apparatuses is installed in the same office, if a timing at which the life of each of the image forming apparatuses expires differs from a timing of maintenance work, the maintenance work needs to be performed each time the life of any of the image forming apparatuses expires, which takes many maintenance costs.

SUMMARY OF THE INVENTION

According to an aspect of the present invention, an information processing apparatus includes a first prediction unit configured to predict, for at least one of a plurality of parts in a plurality of apparatuses, each of the apparatuses capable of processing a job to be input, a job amount that can be processed until the part becomes unable to operate normally, a second prediction unit configured to predict a job amount to be input to the plurality of apparatuses until maintenance work in which at least one of the parts is replaced is performed, and a determination unit configured to determine a method for distributing the input job among the plurality of apparatuses based on respective prediction results of the first prediction unit and the second prediction unit.

Further features of the present invention will become apparent from the following description of exemplary embodiments with reference to the attached drawings.

BRIEF DESCRIPTION OF THE DRAWINGS

FIG. 10 is a diagram briefly illustrating an evaluation value according to the fourth exemplary embodiment.

DESCRIPTION OF THE EMBODIMENTS

Figure 1:
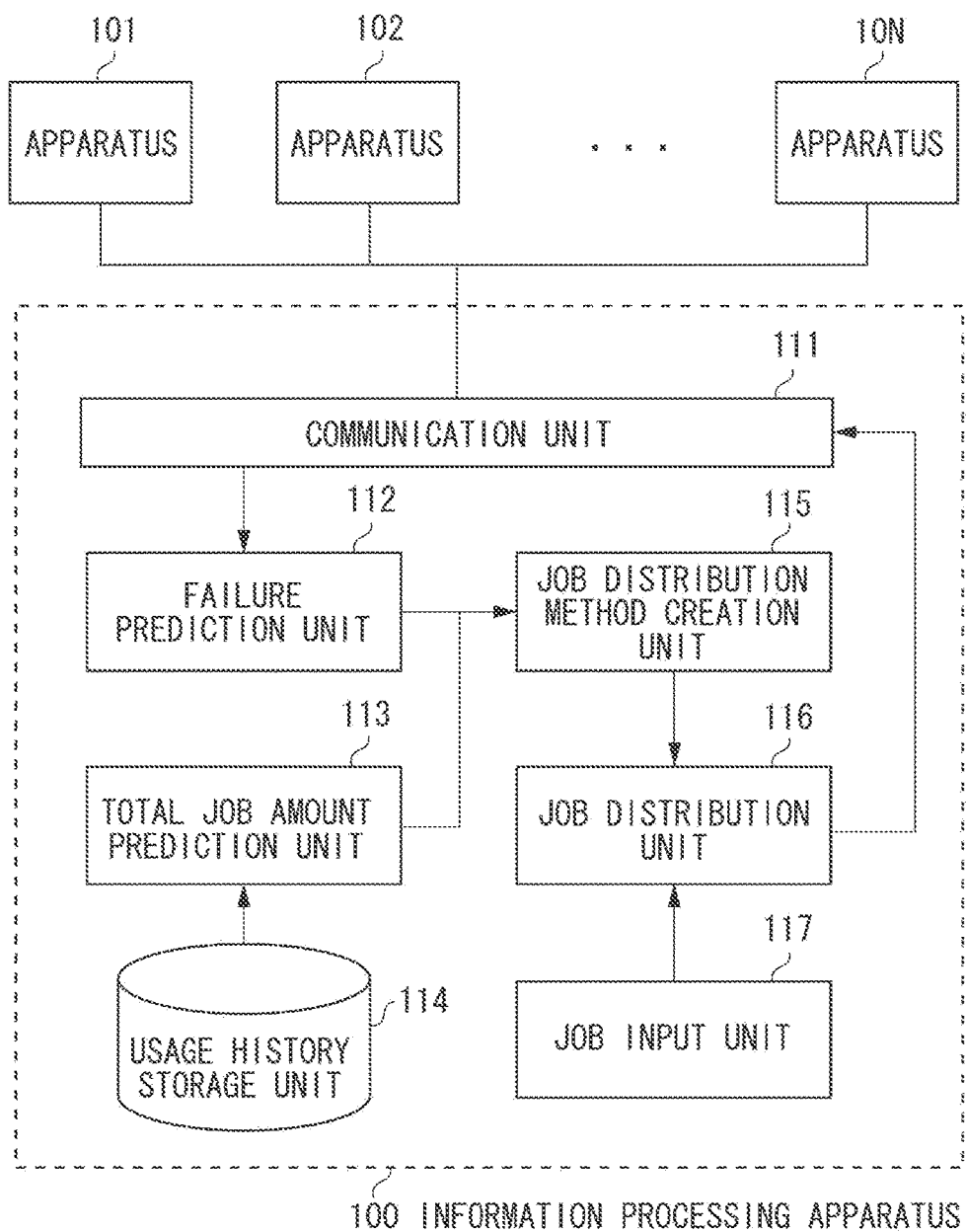
FIG. 1 illustrates a software configuration of an information processing apparatus according to a first exemplary embodiment.

A first exemplary embodiment will be described below. The present exemplary embodiment provides a technique applicable to a situation where a plurality of apparatuses capable of processing the same job can be used. For example, a large office or a light printing industry may own a plurality of image forming apparatuses for the purpose of improving throughput and preparing for an occurrence of downtime. While a target apparatus is described below as being an image forming apparatus in the present exemplary embodiment, the present exemplary embodiment is also applicable to an apparatus other than the image forming apparatus. The target apparatus in the present invention may be any apparatus as long as a plurality of apparatuses respectively having similar functions to that of the apparatus is installed near the apparatus and can execute a certain job. An example of the apparatus to which the present exemplary embodiment is applicable includes a plurality of production lines and manufacturing apparatuses having the same manufacturing capacity.

In the image forming apparatus according to the present exemplary embodiment, units such as a toner cartridge, a drum, and a fixing unit are respectively replacement parts, and one apparatus includes a plurality of replacement parts. However, the present exemplary embodiment is also applicable to a case where one apparatus includes at least one replacement part. A service engineer replaces the parts, as needed, at a time of regular maintenance work. The maintenance work also includes cleaning and adjustment of the part in which a failure may occur to normally operate the apparatus in addition to the work for replacing the part. A target of failure prediction and maintenance may not the part but the apparatus itself.

In the present exemplary embodiment, a "job amount" indicates a unit of operation of an apparatus, and is, if the apparatus is the image forming apparatus, the number of prints (a counter value of the image forming apparatus), for example. If the number of prints is the job amount, a consumed amount of the part differs depending on the size of sheets to be printed. Therefore, the reference sheet size is set. When sheets of the other sheet size are printed, the job amount may be calculated based on the converted value. If the A4 size is set as the reference sheet size, for example, one print of the A4 size is set as one job. A print of the A3 size is converted as two jobs. The job amount may be corrected depending on a print amount and a print density on a sheet for each of the prints. If a print having a high print density is made, for example, correction is provided so that the job amount increases.

The job amount is not limited to the number of prints. Another criterion representing a unit of operation of an apparatus may be used. As another example of a unit of operation of the image forming apparatus, a print instruction including printing of a plurality of pages as a set may be one job. If the target apparatus is an apparatus other than the image forming apparatus, a job amount may be set based on a criterion appropriate for a unit of operation of the target apparatus. If the target apparatus is a manufacturing apparatus, for example, processes for producing one product may be one job.

In the present exemplary embodiment described below, a job amount to be processed until a certain part does not satisfy expected function and performance due to degradation and wear is predicted as a job amount to be processed until a failure occurs in the part. However, the job amount may be a job amount to be processed until a consumable such as toner is consumed to its usable limit. In the following description, states where a part and an apparatus becomes unable to operate normally, including a sudden failure and an expiration of a life due to wear and consumption, are collectively referred to as a "failure".

<Entire Configuration>

The present exemplary embodiment will be specifically described below with reference to the drawings. FIG. 1 is a block diagram illustrating a software configuration of an information processing apparatus 100 according to the present exemplary embodiment. In FIG. 1, apparatuses 101 to 10N are N apparatuses respectively having similar functions, i.e., image forming apparatuses installed in the same office in the present exemplary embodiment. The information processing apparatus 100 is connected to the apparatuses 101 to 10N via a network (e.g., a local area network (LAN)).

The information processing apparatus 100 can be implemented by executing software (a program) acquired via a network or various information recording media using a computer including a central processing unit (CPU), a memory, a storage device, an input/output device, a bus, and a display device. The computer may be a general-purpose computer, or may be hardware suitably designed for a program according to the present invention. The information processing apparatus 100 may exist as an independent processing apparatus, as illustrated in FIG. 1, or may be configured integrally with any one of the apparatuses 101 to 10N.

The information processing apparatus 100 includes a communication unit 111, a failure prediction unit 112, a total job amount prediction unit 113, a usage history storage unit 114, a job distribution method creation unit 115, a job distribution unit 116, and a job input unit 117. The communication unit 111 is an interface for transmitting and receiving information to and from the apparatuses 101 to 10N. The failure prediction unit 112 functions as a first prediction unit in the present invention, and performs processing for acquiring information about respective internal states of the apparatuses 101 to 10N via the communication unit 111 and predicting the occurrence of a failure of each part in each of the apparatuses. While the failure prediction unit 112 is included in the information processing apparatus 100 in the present exemplary embodiment, the failure prediction unit 112 may be included in each of the apparatuses 101 to 10N. In this case, the failure of the part in each of the apparatuses is predicted within the own apparatus, and a failure prediction result is transmitted to the information processing apparatus 100.

The usage history storage unit 114 stores a past usage history of each of the apparatuses or all of the apparatuses. The total job amount prediction unit 113 functions as a second prediction unit in the present invention, and predicts a total job amount to be processed by all of the apparatuses 101 to 10N up to a timing of next maintenance work based on information stored in the usage history storage unit 114. A user himself/herself may predict and input a job amount to be processed until the next maintenance work, as described below. In the case, the total job amount prediction unit 113 and the usage history storage unit 114 may not be included in the information processing apparatus 100.

The job distribution method creation unit 115 creates a method for distributing the job among the apparatuses based on the total job amount to be processed until the next maintenance work and the failure prediction result of each part. More specifically, the job distribution method creation unit 115 functions as a determination unit that determines the job distribution method. In the present exemplary embodiment, a maintenance cost mainly including a downtime cost and a part cost is set as an evaluation value, and the job distribution method creation unit 115 creates the job distribution method in which the evaluation value (maintenance cost) is minimized. A method for calculating the maintenance cost will be specifically described below in the following exemplary embodiment.

The job distribution unit 116 is a functional unit that distributes the job based on the job distribution method created by the job distribution method creation unit 115, and distributes the job input from the job input unit 117 to any one of the apparatuses 101 to 10N via the communication unit 111. The job input unit 117 is a functional unit that receives print data related to execution of a print. The print data may be acquired from the communication unit 111 via a network, or may be acquired from another user interface.

The outline of the present exemplary embodiment will be described below. FIG. 2 illustrates the job distribution method in the present exemplary embodiment. FIG. 2 illustrates a relationship among a job amount to be processed by each of the apparatuses 101 to 10N up to the next maintenance timing, a failure occurrence time, and a maintenance timing. A horizontal direction in FIG. 2 indicates an elapse of time. In the present exemplary embodiment, each of the apparatuses 101 to 10N includes parts A and B. Timings 201 to 204 and timings 221 to 224 respectively indicate predicted failure occurrence times, and a timing 210 indicates a predetermined maintenance timing.

Figure 2A:
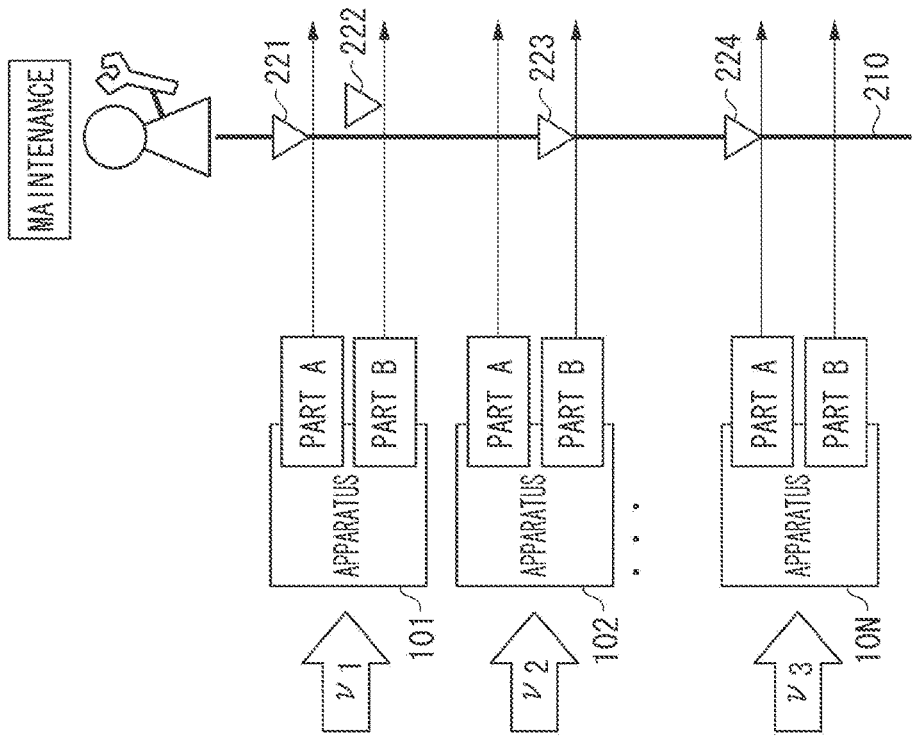
FIGS. 2A and 2B illustrate a job distribution method according to the first exemplary embodiment.

FIG. 2A illustrates a relationship between the failure occurrence times predicted when the same job amounts $v'_1$ to $v'_N$ are respectively distributed to the apparatuses 101 to 10N up to the next maintenance timing and the maintenance timing 210. In a case where the maintenance work is performed based on prediction of a failure, the part, which is predicted to fail at a time not far from the maintenance timing 210, is also replaced at the maintenance timing 210. In FIG. 2A, the failure occurrence times 201 to 204 are close to the maintenance timing 210. Therefore, the parts A and B in the apparatus 101, the part B in the apparatus 102, and the part A in the apparatus 10N are replaced at the maintenance timing 210.

However, in this case, the part B in the apparatus 102 (the failure occurrence time 203), for example, is replaced before being completely consumed. More specifically, a usable amount of the part B in a period corresponding to an arrow 211 is wasted, thereby generating a part cost. On the other hand, the part A in the apparatus 10N (the failure occurrence time 204) is predicted to fail at the timing 204 before the maintenance timing 210. In this case, maintenance is not performed up to the maintenance timing 210. Therefore, the apparatus 10N cannot be used during a period 212, thereby generating a downtime occurrence cost.

Figure 2B:
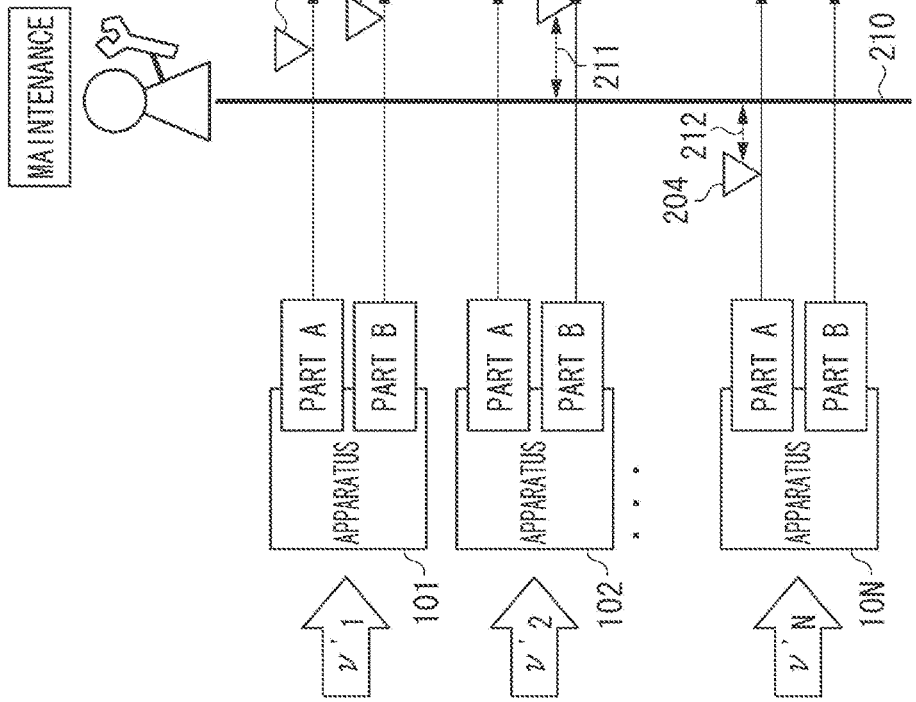

The present exemplary embodiment aims at adjusting a job amount to be distributed among the apparatuses to bring a failure occurrence time closer to a maintenance time to reduce the part cost and the downtime occurrence cost. FIG. 2B illustrates a case where job amounts $v_1$ to $v_N$ are set to bring the failure occurrence time of each of the apparatuses closer to the maintenance timing 210. More specifically, in FIG. 2B, the job amounts $v_1$ and $v_2$ are set larger and the job amount $v_N$ is set smaller than the job amounts $v'_1$ to $v'_N$ illustrated in FIG. 2A (the sizes of arrows indicating the job amount $v'$ and the job amount $v$ in FIGS. 2A and 2B, respectively, indicate job amounts). When the job amounts are thus set, the parts in each of the apparatuses 101 and 102 are consumed earlier than when the job amounts are made uniform, and the respective failure occurrence times 221, 222, and 223 of the parts become closer to the maintenance timing 221. As a result, the part can be replaced at the next maintenance timing without a remaining usable amount of the part, so that the part cost decreases. On the other hand, in the apparatus 10N of FIG. 2B, in which the job amount to be processed is reduced compared to that in FIG. 2A, the failure occurrence time of the part becomes late, and thus the failure occurrence time 224 becomes closer to the maintenance timing 210. As a result, there is no period during which downtime may occur, so that a downtime occurrence cost decreases.

As described above, in the present exemplary embodiment, the job amounts $v_1$ to $v_N$ (job distribution methods) to be processed by the plurality of apparatuses until the next maintenance are found, so that the failure prediction time matches the maintenance timing as much as possible. A method for thus distributing the job among the plurality of apparatuses will be described below.

<Processing Flow>

In the present exemplary embodiment, a next maintenance timing is previously determined, and is determined according to a visiting plan made by a service engineer for an apparatus that the service engineer is in charge of, for example. In this case, the information processing apparatus 100 has a function of obtaining the visiting plan (information about a maintenance timing of the apparatus) determined by the service engineer. As another example of a method for determining the maintenance timing, a user of an apparatus may previously determine the maintenance timing and request maintenance of the service engineer while inputting information about the maintenance into the apparatus.

The entire processing flow of the information processing apparatus 100 according to the present exemplary embodiment will be described first with reference to FIG. 3, and then details of processing by each of the functional units will be described below.

Figure 3:
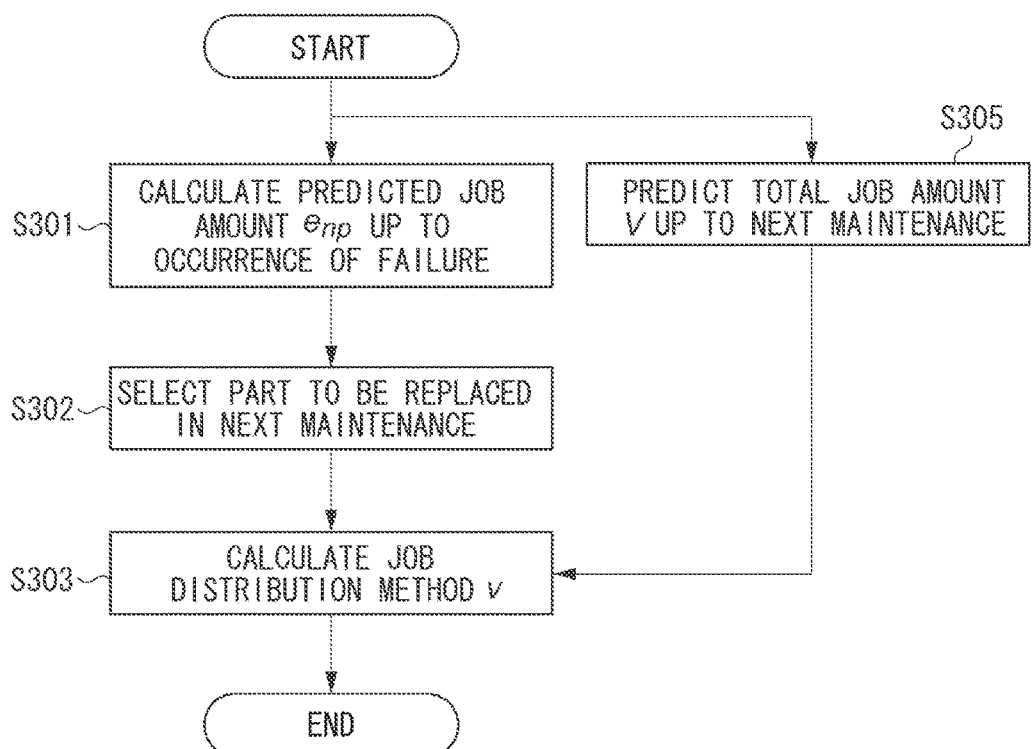
FIG. 3 is a flowchart illustrating a processing flow of the information processing apparatus according to the first exemplary embodiment.

In FIG. 3, in step S301, the failure prediction unit 112 predicts a failure of each part in each of the apparatuses 101 to 10N, and calculates a job amount $e_{np}$ (hereinafter referred to as a predicted job amount) until a failure occurs in a part p in an apparatus n. In step S302, the job distribution method creation unit 115 then selects the part required to be replaced in next maintenance based on the predicted job amount $e_{np}$ for each part.

On the other hand, in step S305, the total job amount prediction unit 113 predicts a total job amount V that is predicted to be processed by all of the apparatuses 101 to 10N until the next maintenance. Specifically, and the total job amount prediction unit 113 calculates the total job amount V that is predicted to be processed up to a maintenance timing from a past used amount of each of the apparatuses 101 to 10N stored in the usage history storage unit 114 and a period of time elapsed until a scheduled maintenance timing (maintenance date).

In step S303, the job distribution method creation unit 115 then calculates a maintenance cost from the predicted job amount $e_{np}$, the total job amount V, and a next maintenance timing D for the part selected as a replacement target of the next maintenance, and calculate a job distribution method in which the maintenance cost is minimized.

<Failure Prediction Unit>

Details of processes performed in steps of FIG. 3 will be described below. First, the process performed in step S301 by the failure prediction unit 112 will be described below. The failure prediction unit 112 acquires information about an internal state of each of the apparatuses via the communication unit 111, and outputs a predicted job amount as a remaining usable amount of each part in each of the apparatuses. Examples of the internal state of the apparatus, if the apparatus is the image forming apparatus, include a used amount of toner, a frequency and a pattern of the occurrence of an event (a jam, an alarm, or an error), and counter values such as the number of prints and an amount of drum rotation. The internal state of the apparatus also includes sensor information about a vibration sensor, a temperature sensor, and a current sensor in the image forming apparatus. The failure prediction unit 112 may use not only information about the current internal state but also information about internal states accumulated in the past.

The expiration of life of a consumable part is also referred to as a failure in the present exemplary embodiment, as described above. In a consumable part such as toner, for example, a remaining processable job amount can be predicted relatively simply from a current remaining amount of the toner and an average used amount of the toner per job. In a part in which information about an internal state to be directly linked to its life, such as the remaining amount of the toner, can be obtained, the remaining processable job amount may be predicted as a predicted job amount. A remaining job amount until the part reaches the end of its life may be predicted not from an average consumed amount per job but based on a regression model such as a linear regression model.

On the other hand, there is a method for previously collecting, for a part of which remaining job amount until a failure (sudden failure or an expiration of life) cannot be simply calculated, internal state data before the failure occurs as leaning data and predicting the remaining job amount based on a statistical pattern of the leaning data. Like in a technique discussed in Japanese Patent Application Laid-Open No. 2008-70800, there is a method for predicting, if current internal state data is close to internal state data previously prepared x jobs before the occurrence of a failure, that the failure occurs after x jobs. In the technique discussed in Japanese Patent Application Laid-Open No. 2008-70800, it is determined whether a certain type of abnormality occurs after x job. This can be used in processing performed by the failure prediction unit 112 in the present exemplary embodiment if the issue is replaced with whether a failure of a certain part occurs after x job for. If a failure occurrence time is estimated using previously prepared learning data, methods such as a k-Nearest Neighbor (kNN) method and a Decision Tree method may also be used. The techniques are publicly known, and hence detailed description thereof is omitted.

As described above, the failure prediction unit 112 calculates the remaining processable job amount as the predicted job amount $e_{np}$ for each of the parts p in each of the apparatuses n.

<Job Distribution Method Creation Unit>

Processing performed by the job distribution method creation unit 115 will be described below. In step S302, the job distribution method creation unit 115 first selects a part to be replaced in next maintenance according to a predetermined criterion. As described above, the failure prediction unit 112 calculates a predicted job amount $e_{np}$ of each part. The part p in the apparatus n, of which the predicted job amount $e_{np}$ is small, is to be replaced in next maintenance because a failure will occur in the near future. Therefore, in the present exemplary embodiment, the part p of which the predicted job amount $e_{np}$ takes a value smaller than a predetermined value is a part to be replaced in next maintenance. For each of the parts p in the present exemplary embodiment, the predicted job amount $e_{np}$ takes a value smaller than a predetermined value.

Calculation of a job distribution method executed in step S303 will be described below. An evaluation value (maintenance cost) in the present exemplary embodiment is calculated based on a predicted failure occurrence time and a scheduled maintenance timing. When the failure occurrence time is later than the maintenance timing, as described above with reference to FIG. 2, the part is replaced before being used to its limit, thereby generating a part cost. On the other hand, when the failure occurrence time is earlier than the maintenance timing, there is a risk of the occurrence of downtime, and thus a treating cost such as cost of a visit made by the service engineer, as needed, is required. As described above, if the failure occurrence time is far from the maintenance timing, the maintenance cost rises. Therefore, the failure occurrence time desirably matches the maintenance timing as much as possible. In the present exemplary embodiment, the method for distributing the job among the plurality of apparatuses is calculated for the purpose of adjusting the respective job amounts of the plurality of apparatuses to reduce the maintenance cost.

In the following description, a job distribution method v is a vector having job amounts (hereinafter referred to as processed job amounts) $v_1$ to $v_N$, to be respectively executed per day up to a maintenance timing by the apparatuses 101 to 10N, as elements, as expressed by the following equation 1:

$$v = (v_1, v_2, \ldots v_N)^T \quad (1)$$

While the processed job amount $v_n$ is a job amount to be processed per day in the present exemplary embodiment, another criterion may be used. For example, the processed job amount $v_n$ may be a job amount to be processed for a certain period of time, or a job amount to be processed by the apparatus n up to the maintenance timing. The job distribution method v is calculated by the following equation 2 using the predicted job amount $e_{np}$ of each part:

$$v = \operatorname*{argmin}_{v} \sum_{p,n} \mathrm{Cost}(e_{np}, v_n) \quad (2)$$

In the equation 2, Cost ( ) is a function for calculating, for the part p in the apparatus n, a maintenance cost when the processed job amount of the apparatus n is $v_n$. The predicted job amount $e_{np}$ calculated by the failure prediction unit 112 is a job amount executable until the part p in the apparatus n fails. According to the equation 2, a combination of the processed job amounts $v_1$ to $v_N$ in which the sum of respective maintenance costs of the apparatuses and the parts can be minimized is obtained as the job distribution method v.

The processed job amounts $v_1$ to $v_N$ need to be consistent with a total job amount V of all the apparatuses to be processed up to the maintenance timing, which is calculated by the total job amount prediction unit 113. Therefore, for such a minimization problem, there is a constraint condition expressed by the following equation 3:

$$V = \sum_{n} D v_n \quad (3)$$

D is the number of days until the maintenance timing, and is a constant because the next maintenance timing is previously determined. The product of D and $v_n$ is a job amount to be processed by the apparatus n up to the maintenance timing. The sum of the respective job amounts of all the apparatuses need to match the total job amount V predicted to be processed up to the maintenance timing by all of the apparatuses.

In addition thereto, another constraint may be placed on a processed job amount to be calculated. For example, the processed job amount is set as a constraint condition because it does not take a negative value. If a maximum job amount $v_{max}$, which can be processed per day by each of the apparatuses, exists, each of the processed job amounts $v_n$ needs to be equal to or less than $v_{max}$. Putting these together, a constraint as expressed by the following expression 4 is placed on the processed job amount $v_n$ of the apparatus n:

$$0 \leq v_n \leq v_{max} \tag{4}$$

When a minimization problem expressed by the expression 2 is solved under the constraint condition, the job distribution method v can be calculated. Details of the maintenance cost will be described below. In the present exemplary embodiment, the maintenance cost is defined using a quadratic function as expressed by the following equation 5:

$$\mathrm{Cost}(e_{np}, v_n) = \alpha_{np}\left(\frac{e_{np}}{v_n} - D\right)^2 \tag{5}$$

In the equation 5, D is the number of days until the maintenance timing. If a first term ($e_{np}/v_n$) in parentheses is $d_{np}$, $d_{np}$ is a failure occurrence time (the remaining number of days) at which a failure is predicted to occur in the part p in the apparatus n when the processed job amount is $v_n$. In the equation 5, a square error of the number of days up to the maintenance timing and the number of days until the failure is set as a maintenance cost.

Figure 4:
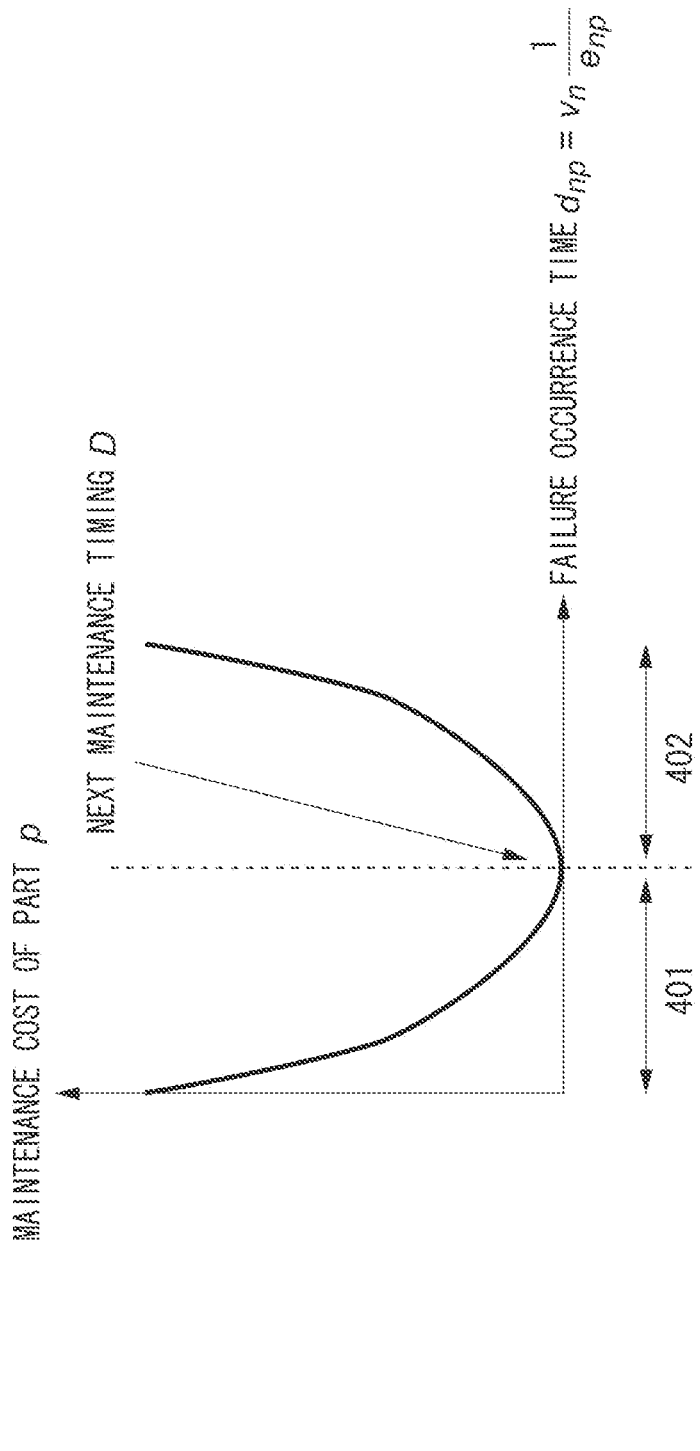
FIG. 4 illustrates a maintenance cost function according to the first exemplary embodiment.

FIG. 4 illustrates a maintenance cost function expressed by the equation 5. A maintenance cost is obtained as a square error. Therefore, the larger a deviation from the maintenance timing D becomes, the larger the cost becomes. A cost generated when the failure occurrence time d is predicted to be earlier than the maintenance timing D (a region 401 in FIG. 4) is due to the risk of the occurrence of downtime. On the other hand, a cost generated when the failure occurrence time d is predicted to be later than the maintenance timing D (a region 402 in FIG. 4) indicates a part cost generated when the part is replaced with a remaining usable amount of the part unused.

In the equation 5, $\alpha_{np}$ is a weight coefficient for the maintenance cost of the part p in the apparatus n. The degree of importance can be set for each part by the weight coefficient $\alpha_{np}$. When high weighting is added to a high-cost part, for example, a job distribution method, which focuses on a maintenance cost of the high-cost part, can be calculated. Thus, the high-cost part can be used to its limit, so that a part cost can be expected to decrease. A part to which weighting is added may not only a high-cost part but also an important part for an operation of the apparatus. In this case, weighting is conversely reduced for a part having a function that is only partially lost even if a failure occurs regardless of a principal operation of the apparatus. Alternatively, respective maintenance costs of all the parts may be equivalent to one another without weighting being set.

If the maintenance cost is defined by a quadratic function, the job distribution method v can be calculated in the following manner. First, the equation 2 is rewritten to express a target function f(v) by the following equation 6. Further, a constraint condition in the equation 3 is also rewritten to obtain the following equation 7.

$$f(v) = \sum_{p,n} \mathrm{Cost}(e_{np}, v_n) \tag{6}$$

$$g(v) = V - \sum_n Dv_n = 0 \tag{7}$$

The job distribution method v to be an optimum solution is found based on the target function f(v) and the constraint condition. The optimum solution can be calculated when v and λ in the following equation 8 are found by a Lagrange's method of undetermined multipliers:

$$\nabla L(v,\lambda) = \nabla f(v) + \lambda \nabla g(v) = 0 \tag{8}$$

<Job Distribution Unit>

The job distribution unit 116 distributes the job, which has been received by the job input unit 117, among the apparatuses 101 to 10N according to the job distribution method v calculated in the foregoing manner. In the present exemplary embodiment, the job distribution method v is calculated as a job amount to be processed by each of the apparatuses per day. Therefore, the input job may be distributed so that the job amount per day by each of the apparatuses follows the job distribution method v.

One job may be distributed among the apparatuses, or a plurality of jobs may be collectively distributed among the apparatuses. In an example in which a target apparatus is the image forming apparatus, like in the present exemplary embodiment, when one job is one print, the apparatus, which executes the job, is selected for each job according to the job distribution method. If the user issues an instruction to print a plurality of pages, however, the pages may be respectively output from the different apparatuses. When a print output is dispersed among the plurality of apparatuses, this is inconvenient for the user. Therefore, a job is preferably distributed so that a bunch of jobs is collectively distributed among the same apparatus. In such a case, the distribution of the job to be executed by each of the apparatuses in a certain period (e.g., one day) is controlled so that the job follows the job distribution method.

Information about the apparatus at a job distribution destination, which has been determined by the job distribution unit 116, may be displayed on a display unit in the information processing apparatus 100 or a display unit in the other apparatus, to inform the user of the information. In such a form, the job distribution unit 116 may have a function of displaying, on the display unit, information about the apparatus at the distribution destination of the determined job. The user can confirm the apparatus that executes the instructed job, and can confirm the apparatus from which the user takes the print output, for example.

The information about the apparatus at the job distribution destination may be displayed on the display unit before the job is executed, so that the user finally determines the apparatus that executes the job. Thus, the job distribution unit 116 recommends the apparatus to be preferentially used according to the job distribution method, and presents the recommended apparatus to the user. The user can select the apparatus, which actually executes the job, based on the display. Alternatively, the user may also select the apparatus that actually executes the job without the job distribution unit 116 particularly selecting the apparatus that actually executes the job to present the job distribution method itself to the user.

<Processing Timing>

In the present exemplary embodiment, a timing at which the job distribution method is calculated (updated) is not limited to a specific time. For example, the job distribution method can be calculated (updated) by various methods such as a method for performing calculation periodically (e.g., every day) and a method for performing calculation when a period of time elapsed until next maintenance reaches a predetermined period of time. While failure prediction processing is performed as needed, the job distribution method may be calculated when a part of which predicted job amount (remaining job amount) is small is present.

As described above, according to the present exemplary embodiment, respective evaluation values related to maintenance costs for the plurality of apparatuses are calculated, and a job distribution method of which the maintenance cost is minimized is calculated based on the calculated evaluation value. The maintenance cost for the plurality of apparatuses can be reduced by performing control to distribute the job among the plurality of apparatuses according to the calculated job distribution method. An example in which the maintenance cost becomes lower when failure occurs in each of the plurality of apparatuses at the same timing is described above. However, depending on a user, there may exist a case where the productivity is more improved so that the cost becomes lower when any one of the plurality of apparatuses owned by the user is operating. In such a case, a cost function may be set so that the maintenance cost becomes higher when the respective timings of the failures in the plurality of apparatuses are uniform.

Modification to First Exemplary Embodiment

In the above described first exemplary embodiment, the configuration in which the job distribution method for minimizing the maintenance cost, i.e., the evaluation value, is calculated and the job is distributed among the plurality of apparatuses according to the calculated distribution method is described. However, the job distribution method may be determined not only from the viewpoint of minimizing a maintenance cost but also from the viewpoint of maximizing a user's advantage. For example, a decrease in the risk of the occurrence of downtime is a user's advantage. When a part cost is imposed on a user, a decrease in the part cost becomes a user's advantage. In other words, when an evaluation value is set as a value related to the user's advantage, the job distribution method can also be calculated so that the evaluation value related to the user's advantage is maximized.

Figure 5:
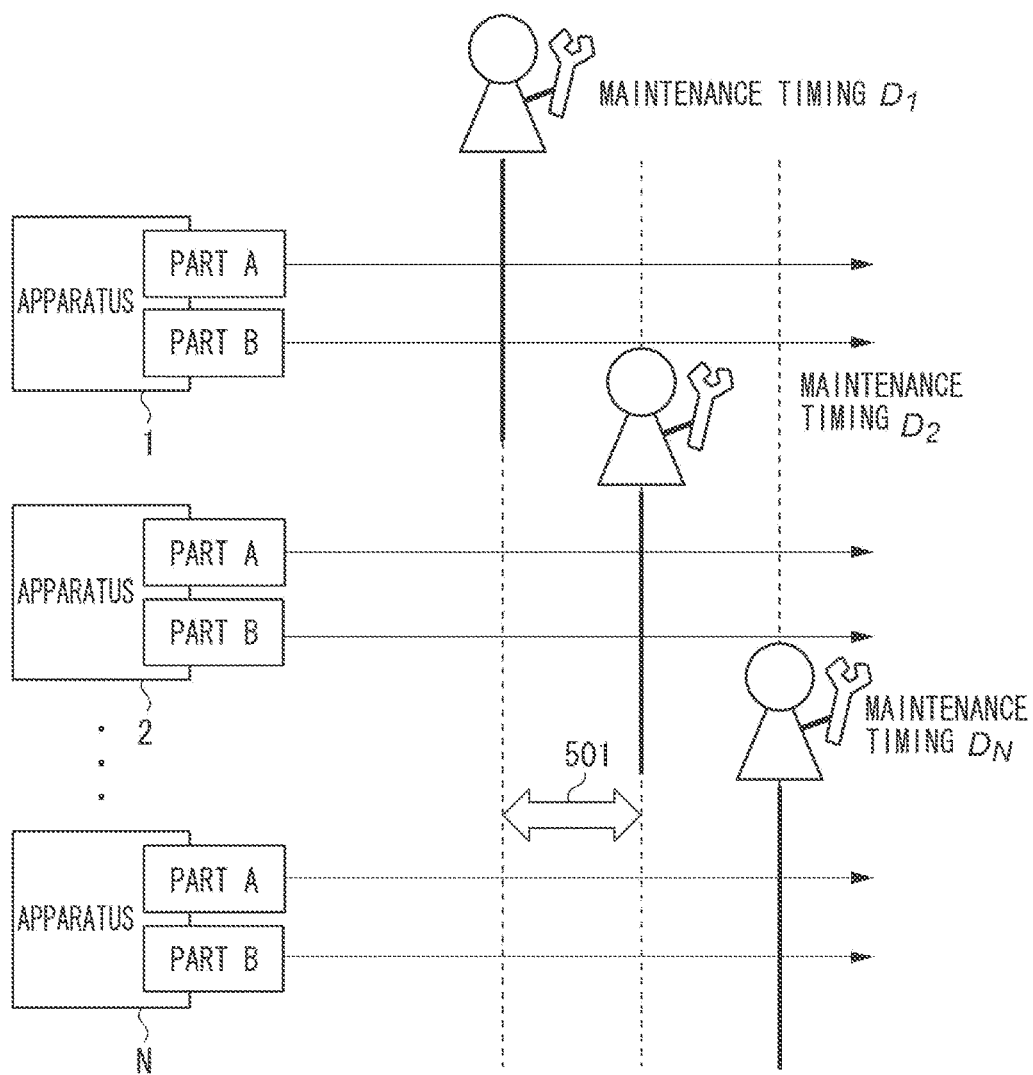
FIG. 5 is a conceptual diagram illustrating a case where a different maintenance timing is set for each information processing apparatus according to the first exemplary embodiment.

In the above described first exemplary embodiment, a case where maintenance is performed on a plurality of apparatuses at the same maintenance timing is described as an example. Generally, maintenance work takes time. It is likely that the maintenance work is sequentially performed on the plurality of apparatuses one by one. Therefore, different maintenance timings $D_n$ may be respectively set for the apparatuses. FIG. 5 is a conceptual diagram illustrating a case where different individual maintenance timings $D_n$ are respectively set for apparatuses. In FIG. 5, $D_1$ is set as a maintenance timing of an apparatus 1, $D_2$ is set as a maintenance timing of an apparatus 2, and $D_N$ is set as a maintenance timing of an apparatus N. In other words, there is a difference 501 in the maintenance timing between the apparatus 1 and the apparatus 2, and the difference 501 corresponds to a maintenance work time of the apparatus 1.

In this manner, if the different maintenance timings are respectively set for the apparatuses, a maintenance cost function represented by the equation 5 is expressed by the following equation 9 by respectively replacing a maintenance timing D, which is common among all the apparatuses, with the maintenance timings $D_n$ of each of the apparatuses:

$$\text{Cost}(e_{np}, v_n, D_n) = \alpha_{np}\left(\frac{e_{np}}{v_n} - D_n\right)^2 \quad (9)$$

In the equation 9, the job distribution method is calculated so that the closer a failure occurrence time of a part p in an apparatus n becomes to the maintenance timing $D_n$ of the apparatus n, the lower a maintenance cost becomes.

A second exemplary embodiment of the present invention will be described below. In the first exemplary embodiment, the part to be replaced at in next maintenance is determined before the job distribution method is calculated (step S302 illustrated in FIG. 3). On the other hand, in the present exemplary embodiment, a configuration in which a job distribution method is calculated without limiting a part to be replaced in next maintenance, and a part to be replaced in the next maintenance is determined based on the calculated job distribution method will be described. The constituent elements already described in the first exemplary embodiment are assigned the same reference numerals, and hence description thereof is not repeated.

Figure 6:
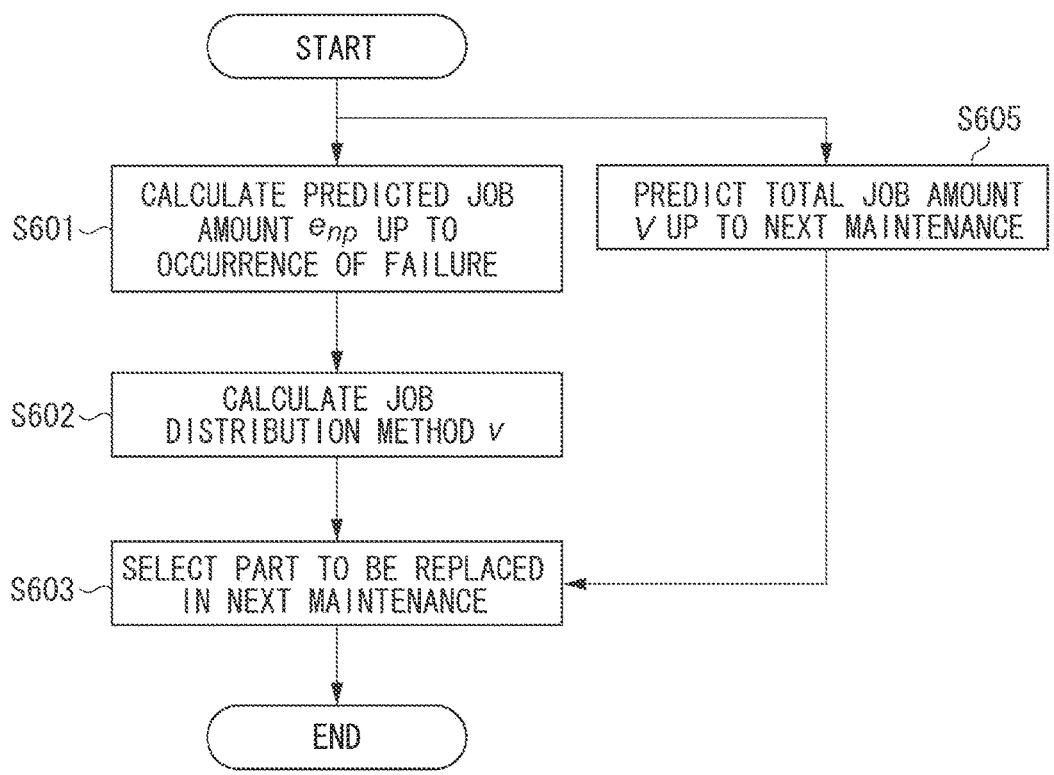
FIG. 6 is a flowchart illustrating a processing flow of an information processing apparatus according to a second exemplary embodiment.

FIG. 6 is a flowchart illustrating a processing flow of an information processing apparatus 100 according to the present exemplary embodiment. In FIG. 6, in step S601, the failure prediction unit 112 predicts a failure of each part in each of apparatuses, and calculates the job amount $e_{np}$ until the failure occurs. In step S601, a similar process to that in step S301 of FIG. 3 is performed. In step S605, the total job amount prediction unit 113 calculates a total job amount V until next maintenance, and a similar process to that in step S305 of FIG. 3 is performed.

In the present exemplary embodiment, a maintenance cost is calculated for each of all parts p in all apparatuses n in a state where the part p to be replaced in the next maintenance is not selected. While a maintenance cost represented by the quadratic function expressed by the equation 5 is set in the first exemplary embodiment, a maintenance cost function different therefrom is set in the present exemplary embodiment.

Figure 7:
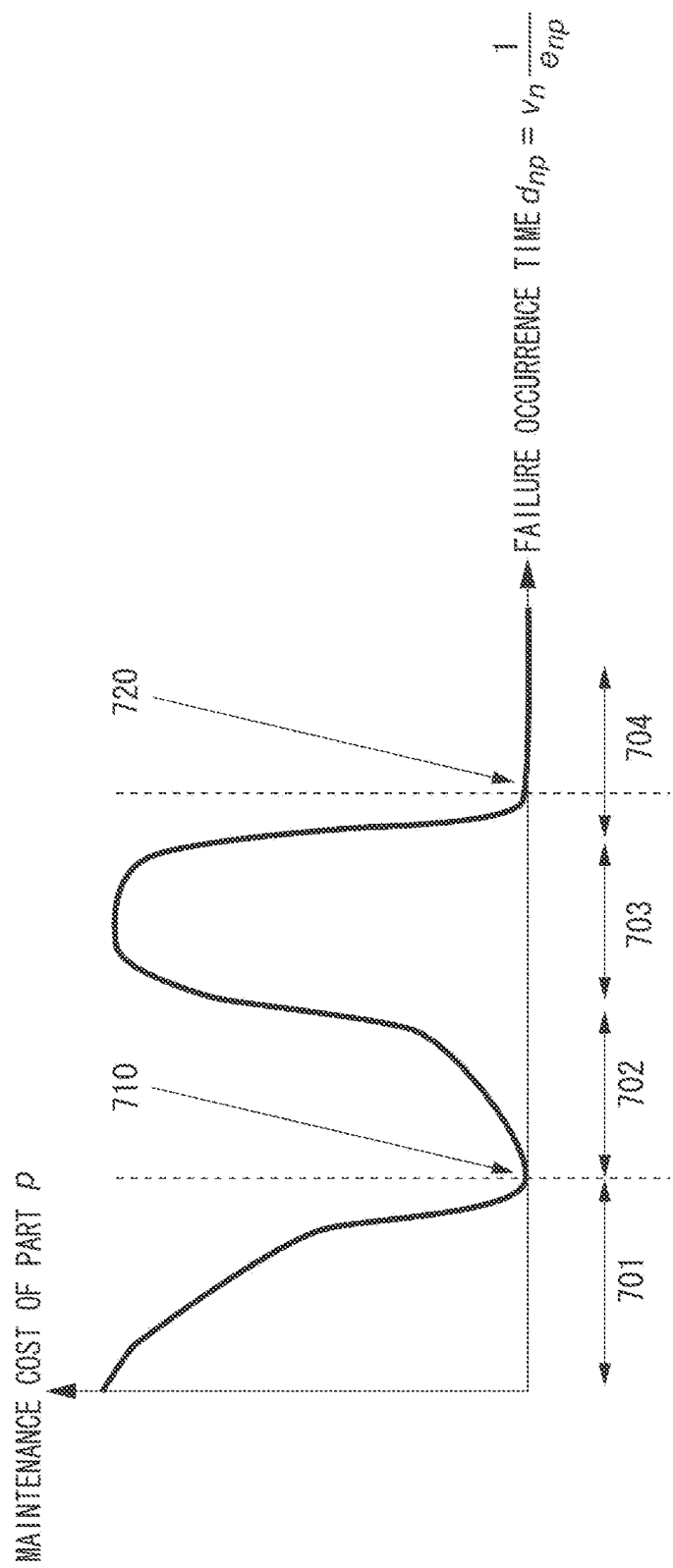
FIG. 7 is a graph illustrating a relationship between respective maintenance costs and a plurality of failure occurrence timings according to the second exemplary embodiment.

In the present exemplary embodiment, a failure occurrence time $d_{np}$ of the part p in the apparatus n is obtained from a predicted job amount $e_{np}$ until a failure and an assumed processed job amount $v_n$ (a job amount per day of the apparatus n), similarly to the first exemplary embodiment. Then, in the present exemplary embodiment, not only a cost related to the next maintenance but also a cost generated until maintenance after the next is considered. FIG. 7 illustrates a maintenance cost for the failure occurrence time $d_{np}$ of the part p in the present exemplary embodiment. In FIG. 7, a timing 710 is a timing of next maintenance, and a timing 720 is a timing of maintenance after the next.

A period 701 corresponds to a period from the current time to the next maintenance timing 710. In this period, the part p fails before the next maintenance timing 710, thereby generating a cost due to a risk of the occurrence of downtime. The closer the predicted failure time $d_{np}$ comes to the next maintenance timing 710, the lower the cost generated due to the risk of the occurrence of downtime becomes, similarly to the cost defined by the quadratic function in the first exemplary embodiment.

A period 702 is a period during which the larger the remaining usable amount of the part p to be replaced at the next maintenance timing 710 is, i.e., the later the predicted failure time $d_{np}$ becomes than the next maintenance timing 710, the higher a part cost becomes. This is also based on a similar idea to that in the first exemplary embodiment. It is considered that the occurrence of downtime should be avoided compared to the rise in the part cost. The rise in the part cost caused by the failure occurrence time $d_{np}$ becoming far from the next maintenance timing 710 in the period 702 is gentler than the rise in the cost caused by the failure occurrence time $d_{np}$ becoming far from the next maintenance timing 710 in the period 701.

A period 703 is a period between the next maintenance timing 710 and a maintenance timing after the next 702. When a failure occurs in this period, an unscheduled maintenance performed by a service engineer by visiting occurs. When the predicted failure time $d_{np}$ lies within this period, therefore, the maintenance cost increases.

Finally, if a period 704 is a period after the maintenance timing after the next 720. If the failure occurrence time $d_{np}$ lies within this period, replacement of the part can be performed at the maintenance after the next. In other words, the maintenance of the part need not be considered for the time being. Therefore, the maintenance cost of the part is minimized.

When the job distribution method v is calculated based on the maintenance cost function thus designed, a method for distributing a job so that a failure occurrence time of each part lies in a period in the vicinity of the next maintenance timing 710 or a period after the maintenance timing after the next 720 can be obtained. The cost function described with reference to FIG. 7 is not limited to this. Any function may be used if a maintenance cost generated until the maintenance timing after the next 720 is considered. A method for creating the cost function may be designed by a person from past performances of the maintenance cost, or may be automatically designed. While maintenance timings until the maintenance timing after the next 720 are considered in the present exemplary embodiment, the job distribution method v may be calculated from a maintenance cost function considering three or more maintenance timings based on the idea about the maintenance costs in the periods 702 to 704. In other words, the present exemplary embodiment is widely applicable to a configuration in which the job distribution method v is calculated based on a plurality of maintenance work timings.

In the present exemplary embodiment, the maintenance cost of each part is calculated based on the cost function designed in the foregoing manner. When the maintenance cost is used, however, the job distribution method v becomes difficult to analytically find, unlike in the first exemplary embodiment. Therefore, the job distribution method v is calculated using a method for giving an appropriate initial value to the job distribution method v and searching for an extreme value of the maintenance cost by repetitive processing in the present exemplary embodiment. The initial value of the job distribution method v can include a value obtained by evenly dividing up the total job amount V among the n apparatuses.

In the search for the extreme value, the total maintenance cost is calculated using the job distribution method v with the initial value. The job distribution method v, with a value in which the initial value is slightly changed, is created, to calculate the maintenance cost again. If the maintenance cost is lower than the last one, the current job distribution method v is adopted. When such a loop is executed until the maintenance cost does not change, the optimum job distribution method v can be calculated. If the total job amount V is considered, the job distribution method v has a constraint caused by the total job amount V, as expressed by the equation 7 in the first exemplary embodiment. Therefore, in processing for slightly changing the job distribution method v, a new job distribution method, which satisfies this constraint, needs to be created.

In FIG. 6, in step S602, the job distribution method creation unit 115 calculates the job distribution method v. In step S603, the part to be replaced in the next maintenance is selected based on the job distribution method v calculated in step S602. In this processing, a failure occurrence time $d_{np}$ of each part may be calculated from the job distribution method v and the predicted job amount $e_{np}$ of the part, and the part of which failure occurrence time $d_{np}$ is close to the next maintenance timing may be selected as the part to be replaced in the next maintenance. A functional unit for notifying a service engineer of information about the part selected in this processing may be provided. The service engineer, who has received the notification, can previously prepare the part to be replaced in the next maintenance.

As described above, in the present exemplary embodiment, the job distribution method is created based on the cost function considering the maintenance cost generated until the maintenance after the next. Thus, the job distribution method suitable for reducing the maintenance cost can be calculated while the appropriate part to be replaced in the next maintenance can be selected.

A third exemplary embodiment of the present invention will be described below. In the first and second exemplary embodiments, a maintenance timing (maintenance date) D is previously determined. In the present exemplary embodiment, a configuration in which an optimum maintenance timing is determined together with a job distribution method v will be described. Constituent elements already described in the first and second exemplary embodiments are assigned the same reference numerals, and hence description thereof is not repeated.

Figure 8:
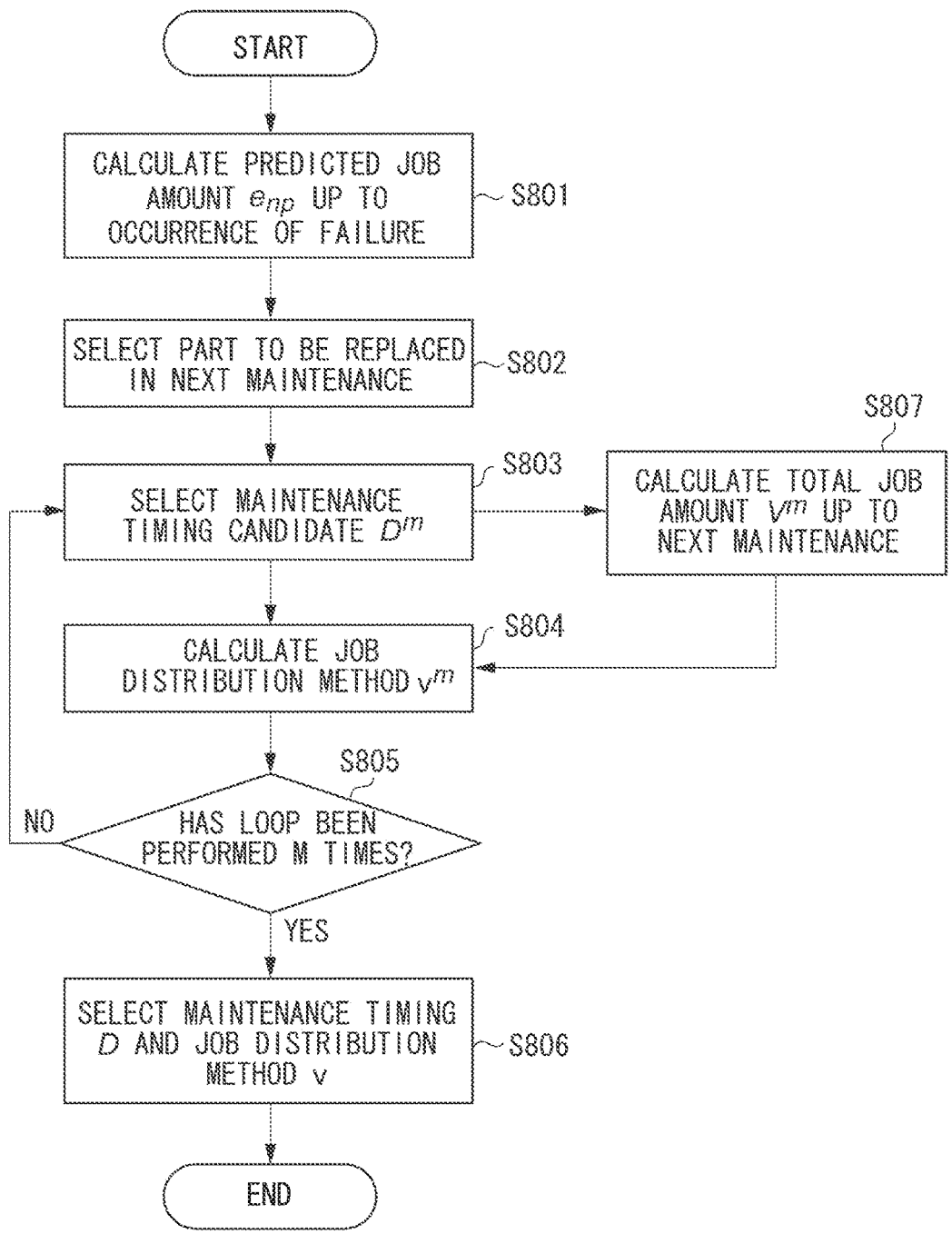
FIG. 8 is a flowchart illustrating a processing flow of an information processing apparatus according to a third exemplary embodiment.

In the present exemplary embodiment, a plurality of maintenance timing candidates is previously prepared, and a maintenance cost and a job distribution method are calculated for each of the maintenance timing candidates. The job maintenance method indicating the minimum maintenance cost is selected, and the maintenance timing candidate at that time is selected as a maintenance timing. FIG. 8 is a flowchart illustrating a processing flow of an information processing apparatus 100 according to the present exemplary embodiment. In FIG. 8, in step S801, a failure prediction unit 112 predicts a failure of each part in each of apparatuses and calculates a job amount $e_{np}$ until the failure occurs, where a similar process to that in step S301 illustrated in FIG. 3 is performed. In step S802, the job distribution method creation unit 115 selects the part to be replaced in next maintenance from a prediction result of the failure prediction unit 112, where a similar process to that in step S302 illustrated in FIG. 3 is performed.

In step S803, one maintenance timing candidate is selected from among M maintenance timing candidates previously prepared. The M maintenance timing candidates are respectively indicated by $D^1, D^2, \ldots, D^m, \ldots D^M$, and the maintenance timing candidate $D^m$ is the number of days from the current time point to the time at which maintenance is performed, for example. The maintenance timing candidate can be acquired by listing a plurality of candidate dates on which next maintenance is performed at a user's convenience or a service engineer's convenience and calculating the respective numbers of days up to the candidate dates. In step S803, the one maintenance timing candidate $D^m$ is selected from among the M maintenance timing candidates.

In step S807, a total job amount $V^m$ until the next maintenance is calculated based on the maintenance timing candidate $D^m$ selected in step S803. In the first exemplary embodiment, the total job amount V up to the previously determined next maintenance timing is calculated based on a period of time until the next maintenance. On the other hand, in the present exemplary embodiment, the total job amount $V^m$ until the next maintenance is calculated based on the selected maintenance timing candidate $D^m$. The total job amount $V^m$ can be calculated based on the past job amount per day and the number of days until maintenance (the maintenance timing candidate $D^m$), like in the first exemplary embodiment.

In step S804, a job distribution method $v^m$ for minimizing a maintenance cost under the condition of the maintenance timing candidate $D^m$ selected in step S803 is calculated. The job distribution method can be calculated by a similar process to that in the first exemplary embodiment. More specifically, a maintenance cost $C^m$, which is minimized when the maintenance timing candidate $D^m$ is selected, is calculated if a maintenance cost of all of the apparatuses, which is expressed by the equation 6, is calculated by the job distribution method $v^m$ as an input, using the following equation 11:

$$C^m = \sum_{p,n} \text{Cost}(e_{np}, v_n^m, D^m) \qquad (11)$$

A similar function to that in the first exemplary embodiment can be used for a cost function Cost ( ), and hence detailed description thereof is omitted. In step S803, the calculated job distribution method $v^m$ and maintenance cost $C^m$ are output for the maintenance timing candidate $D^m$, and the maintenance cost $C^m$ in the job distribution method $v^m$ is stored in a storage unit of the apparatus, as described above.

In step S805, it is determined whether processes in steps S804 and S807 have been performed for all the prepared M maintenance timing candidates. If the processes in steps S804 and S807 have not been performed for all the prepared M maintenance timing candidates, the processing returns to step S803. In step S803, another maintenance timing candidate is selected. If loop processing is performed M times, and the processes in steps S804 and S807 are completed for all the prepared M maintenance timing candidates, the processing proceeds to step S806. From the processes so far described, the calculated job distribution method $v^m$ and maintenance cost $C^m$ are calculated for each of the M maintenance timing candidates $D^m$.

In step S806, the job distribution method creation unit 115 finally determines a maintenance timing and a job distribution method. In step S806, a maintenance cost indicating the smallest value is selected among the M maintenance costs $C^m$. The maintenance timing and the job distribution method corresponding to the maintenance cost are output.

While the maintenance timing candidates $D^m$ are respectively discrete values as a plurality of maintenance candidate dates in the present exemplary embodiment, a target to be searched for an optimum maintenance timing may be a continuous value. For example, the numbers of days and hours in a predetermined period may be searched for an optimum timing. In such a case, the predetermined period is divided into appropriate steps such as one day or one hour, and the number of days and hours in each of the steps are set as the maintenance timing candidates $D^m$. Alternatively, the maintenance timing candidates $D^m$ may be kept updated within the predetermined period, to search for the maintenance timing at which the maintenance cost $C^m$ is minimized by repetitive calculation. In this case, the maintenance timing that can be an appropriate initial value is set in a predetermined period, and the maintenance cost is calculated. The maintenance timing is slightly changed within the predetermined period, to calculate a new maintenance cost. If a new maintenance cost is lower than the last calculated maintenance cost, a new maintenance timing is adopted. When this is repeatedly performed until the maintenance timing does not change, an optimum value of the maintenance timing can be calculated.

As described above, according to the present exemplary embodiment, the optimum maintenance timing is determined from among the plurality of prepared maintenance timing candidates, and, at the same time, the job distribution method among the plurality of apparatuses up to the maintenance timing can be calculated.

A fourth exemplary embodiment of the present invention will be described below. In the present exemplary embodiment, is for calculating an evaluation value related to a maintenance cost based on a distribution of failure occurrence times predicted for a plurality of parts is calculated, and then a job distribution method is calculated based on the calculated evaluation value (maintenance cost). In the present exemplary embodiment, an optimum maintenance timing is determined using a method different from that in the above described third exemplary embodiment based on the calculated distribution method. Constituent elements already described in the first to third exemplary embodiments are assigned the same reference numerals, and hence description thereof is omitted.

Figure 9:
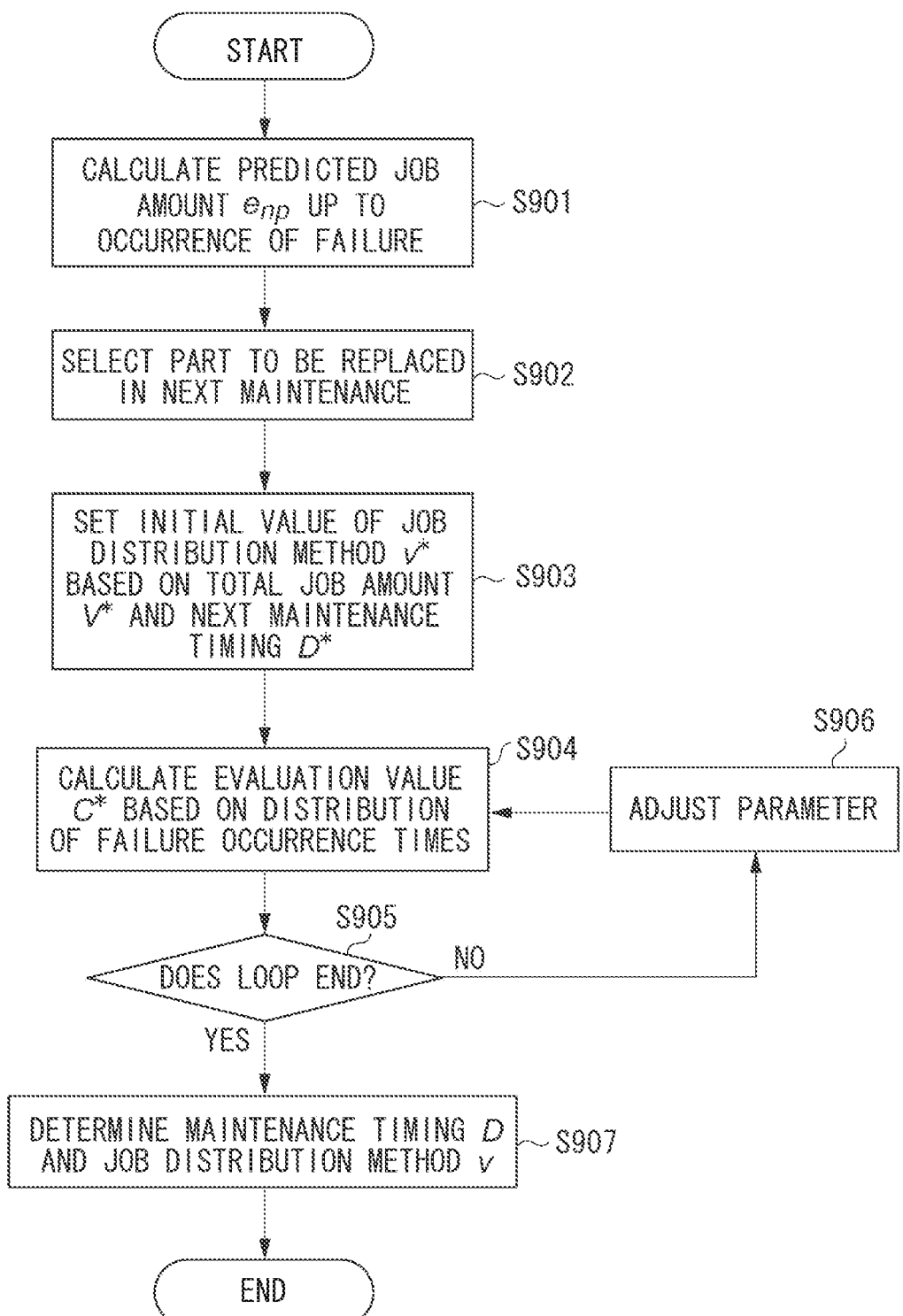
FIG. 9 is a flowchart illustrating a processing flow of an information processing apparatus according to a fourth exemplary embodiment.

FIG. 9 is a flowchart illustrating a processing flow of an information processing apparatus 100 according to the present exemplary embodiment.

In FIG. 9, in step S901, the failure prediction unit 112 predicts a failure of each part in each of apparatuses, to calculate a job amount $e_{np}$ until a failure occurs. In this step, a similar process to that in step S301 illustrated in FIG. 3 is performed. In step S902, a job distribution method creation unit 115 selects the part to be replaced in next maintenance from a prediction result of the failure prediction unit 112. In this step, a similar process to that in step S302 illustrated in FIG. 3 is performed.

In a processing flow in the present exemplary embodiment, repetitive processing is performed, to find an extreme value of an evaluation value and a job distribution method v at that time. Processes in steps S903, S904, S905, and S906 are repetitively executed by the job distribution method creation unit 115. The job distribution method v is calculated in this processing.

In step S903, a total job amount $V^*$ up to next maintenance timing and a next maintenance timing $D^*$ indicating the number of days until then, respectively, are set as initial values for repetitive calculation. A method for setting the initial values is not particularly limited to the above-described method. However, the setting is performed as described below, for example. First, the next maintenance timing $D^*$ is set based on a previously determined date according to respective schedules of a service engineer and a user, similarly to the first exemplary embodiment. The next maintenance timing $D^*$ is a temporary schedule as the initial value. In the present exemplary embodiment, a timing obtained by correcting the maintenance timing $D^*$ is output as a final maintenance timing D. In the following description, "*" indicates a temporary value during repetitive calculation. When the temporary maintenance timing $D^*$ is determined, the total job amount $V^*$ to be processed until maintenance is calculated based on a past use tendency, similarly to the first exemplary embodiment.

Further, in step S903, an initial value of a job distribution method $v^*$ is also set based on the total job amount $V^*$ and the next maintenance timing $D^*$. A value obtained when the total job amount $V^*$ is uniformly distributed among the plurality of apparatuses is set as the job distribution method v*, similarly to the second exemplary embodiment.

In step S904, an evaluation value C* is calculated based on the current job distribution method v* and a job amount until a failure of each part (a predicted job amount $e_{np}$). While a cost function related to a maintenance cost is calculated as an evaluation value in the first to third exemplary embodiments, the evaluation value is calculated based on a distribution of predicted failure occurrence times in the present exemplary embodiment. In a case where an processed job amount serving as an element of the job distribution method v* is $v_n^*$, a predicted failure occurrence time $d^*_{np}$ of a part p in an apparatus n is calculated by the following equation 12, when the predicted job amount is $e_{np}$ and the processed job amount is $v_n^*$. The processed job amount $v_n^*$ is a job amount per day to be distributed among the apparatuses n.

$$d^*_{np} = \frac{e_{np}}{v_n^*} \quad (12)$$

FIG. 10 is a diagram briefly illustrating an evaluation value in the present exemplary embodiment. In FIG. 10, a failure occurrence time $d^*_{np}$ of each of parts in the apparatuses 101 to 10N is indicated by a triangle. For example, a time 1001 indicated by a triangle is a failure occurrence time $d^*_{1B}$ of a part B in the apparatus 101. In a lower part of FIG. 10, the failure occurrence times d*np of the parts are collectively illustrated on the same time axis. For example, a time 1002 indicated by a triangle corresponds to the time 1001, which is the failure occurrence time $d^*_{1B}$ of the part B in the apparatus 101. In a lower part of the FIG. 10, respective failure occurrence times of the parts in the apparatuses other than the apparatuses 101 and 10N are also illustrated. In the present exemplary embodiment, the part to be replaced in next maintenance is selected in step S902. Therefore, only failure occurrence times of the parts to be replaced in the next maintenance are illustrated in FIG. 10.

In FIG. 10, a distribution of the failure occurrence times of the plurality of parts is indicated as a distribution 1003. In the present exemplary embodiment, an evaluation value is calculated based on the distribution. More specifically, a maintenance timing D* is a temporary setting so that, the maintenance timing D* is neglected. A job distribution method for minimizing a variation (distribution) among the failure occurrence times of the plurality of parts is calculated to bring the failure occurrence times close to one another. Then, the maintenance timing is determined based on the failure occurrence time predicted from the calculated job distribution method. Thus, the failure occurrence time can be brought closer to the maintenance timing, so that a maintenance cost can be reduced.

To find a job distribution method for reducing the distribution 1003, an evaluation value is set below based on a dispersion a representing the size of the distribution 1003. The evaluation value C* in the job distribution method v* is calculated in step S904. The evaluation value C* calculated from the failure occurrence time $d_{np}^*$ following the job distribution method $v_n^*$ is expressed by the following equation 13, for example. $\mu^*$ is an average of the failure occurrence times $d_{np}^*$:

$$C^* = \sum_{n,p} (\mu^* - d^*_{np})^2 \quad (13)$$

The evaluation value C* calculated in the foregoing manner, together with the job distribution method v* at that time, is stored in a storage unit in the information processing apparatus 100.

In step S906, the job distribution method v* is updated by changing the job distribution method v* to a value in its vicinity to adjust a parameter in a next loop. The job distribution method v* to be changed is changed within a range in which it is consistent with the total job amount V*. In other words, a new job distribution method v* is created on the condition that the sum of respective job amounts of the apparatuses up to the maintenance timing D* matches the total job amount V*.

If the updated job distribution method v* is obtained, the processing returns to step S904 again. In step S904, the evaluation value C* is calculated. When the job distribution method v* changes, the failure occurrence time $d^*_n$, also changes. Therefore, the dispersion σ (the evaluation value C*) also changes. If a new evaluation value thus obtained is smaller than the previous evaluation value (if a distribution of the failure occurrence times is small), the new job distribution method v* is adopted, and the new evaluation value C* and the job distribution method v* are stored. On the other hand, if the new evaluation value is larger than the previous evaluation value, not the new job distribution method v* but the last job distribution method is adopted.

The foregoing processing is repeatedly performed until it is determined in step S905 that a loop ends, to find the job distribution method v* for reducing the evaluation value C*. If the processing proceeds to step S906 (if the loop does not end) as a result of the determination in step S905, a new job distribution method is created again based on the current job distribution method v*, to calculate the subsequent evaluation value is adopted.

In step S905, it is determined whether the loop ends. In the determination in step S905, the previous evaluation value and the current evaluation value are compared with each other. If a difference therebetween becomes sufficiently small (the difference becomes smaller than a predetermined threshold value) to converge, it is determined that the loop ends. A predetermined upper limit number of times of the loop may be determined, and it may be determined that the loop ends if the number of times of the loop reaches its upper limit.

In step S907, the final job distribution method v* calculated by the above described repetitive processing is set as a final job distribution method v. A maintenance timing D is determined from the job distribution method v. More specifically, a failure occurrence time $d_{np}$ is calculated from the job distribution method v and the predicted job amount $e_{np}$ of each part using the equation 12. An average of the failure occurrence times $d_{np}$ is set as a next maintenance timing D. The average is set as the next maintenance timing because it can be the center of the distribution of the failure occurrence times, so that it is expected that a deviation between each of the failure occurrence times $d_{np}$ and the maintenance timing D becomes small. Alternatively, as another method, the maintenance timing D may be set from another statistic such as a median value of the failure occurrence time. Alternatively, to prevent the occurrence of downtime, a failure occurrence time during which a failure is predicted to occur at a time closest to the current time point or a timing immediately before the failure occurrence time may be the maintenance timing D. A more appropriate maintenance timing D than the maintenance timing D* that is the initial value can be set in the above described processing.

As described above, in the present exemplary embodiment, the evaluation value is calculated based on the distribution of the failure occurrence times, and the job distribution method v and the maintenance timing D are calculated based on the calculated evaluation value. Thus, an optimum maintenance timing and a method for distributing a job among a plurality of apparatuses up to the maintenance timing can be determined.

The job distribution method v and the maintenance timing D calculated in the above description may be further updated by setting the maintenance timing D as the maintenance timing D* that is the initial value again and performing processes in steps S904, S905, S906, and S907. In this case, repetitive calculation for updating the maintenance timing D* that is the initial value is performed until the job distribution method v or the maintenance timing D does not change, to calculate the job distribution method v or the maintenance timing D. Thus, the more optimized job distribution method and optimized maintenance timing can be determined.

The above described configuration enables the maintenance cost for the plurality of apparatuses to be reduced in the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-099468, filed May 14, 2015, which is hereby incorporated by reference herein in its entirety.

What is claimed is:

1. An information processing apparatus comprising:
one or more processors; and
one or more memories storing instructions that, when executed by the one or more processors, cause the information processing apparatus to perform operations comprising:
predicting, for at least one of a plurality of parts in a plurality of apparatuses, the apparatuses each capable of processing an input job and each communicably connected to the information processing apparatus over a computer network, a job amount that is able to be processed until the part becomes unable to operate normally;
selecting, based on the predicted job amount, at least one of the parts to be replaced at a scheduled maintenance timing from among the at least one of the plurality of parts;
predicting a total job amount to be processed by the plurality of apparatuses up to the scheduled maintenance timing on a basis of a job amount processed in the past by each of the plurality of apparatuses and on a basis of a period of time left until the scheduled maintenance timing;
calculating an evaluation value based on the total job amount, the job amount that is able to be processed until the selected at least one of the parts becomes unable to operate normally, and a job amount processed by the selected at least one of the parts per unit period of time;
determining a distribution method for distributing the input job among the plurality of apparatuses based on the evaluation value; and
transmitting over the computer network the input job to the plurality of apparatuses according to the determined distribution method.

2. The information processing apparatus according to claim 1, wherein the calculating calculates the evaluation value related to a maintenance cost of the selected at least one of the parts.

3. The information processing apparatus according to claim 2, wherein the calculating calculates the evaluation value based on a weight set to the selected at least one of the parts.

4. The information processing apparatus according to claim 2, wherein the calculating calculates the evaluation value based on timings at which a plurality of maintenance works are performed.

5. The information processing apparatus according to claim 4, wherein the selecting selects at least one parts to be replaced at the timing at which the next maintenance work is performed among the timings at which the plurality of maintenance works are performed.

6. The information processing apparatus according to claim 2, wherein the calculating calculates the evaluation value for each of candidates for the respective timings of the plurality of maintenance works, determines the timing of the maintenance work based on the calculated evaluation value, and the determining determines a method for distributing the input job up to the timing of the maintenance work.

7. The information processing apparatus according to claim 1, wherein the timing of the maintenance work is individually set for each of the plurality of apparatuses.

8. The information processing apparatus according to claim 2, wherein the maintenance cost increases as a difference between the scheduled maintenance timing and a timing at which the selected at least one of the parts becomes unable to operate normally increases.

9. The information processing apparatus according to claim 1, wherein the determining determines the distribution method based on a distribution of respective timings at which the plurality of parts becomes unable to operate normally.

10. The information processing apparatus according to claim 1, wherein a maintenance cost includes a cost generated when the part has not been used until it is replaced and a cost generated when the part becomes unable to operate normally before it is replaced.

11. The information processing apparatus according to claim 1, wherein the information processing apparatus is an image forming apparatus, and the input job is print data processed by the image forming apparatus.

12. The information processing apparatus according to claim 1,
wherein the operations further comprises dividing data included in the input job into a plurality of portions based on the determined distribution method, and
wherein the transmitting transmits over the computer network the portions of the input job to the plurality of apparatuses according to the determined distribution method.

13. The information processing apparatus according to claim 1, wherein, in the selecting, at least one of the parts the predicted job amount of which is smaller than a predetermined threshold value is selected from among the at least one of the plurality of parts.

14. An information processing method comprising:
predicting, for at least one of a plurality of parts in a plurality of apparatuses, the apparatuses each capable of processing an input job and each communicably connected to the information processing apparatus over a computer network, a job amount that is able to be processed until the part becomes unable to operate normally;
selecting, based on the predicted job amount, at least one of the parts to be replaced at a scheduled maintenance timing from among the at least one of the plurality of parts;
predicting a total job amount to be processed by the plurality of apparatuses up to the scheduled maintenance timing on a basis of a job amount processed in the past by each of the plurality of apparatuses and on a basis of a period of time left until the scheduled maintenance timing;
calculating an evaluation value based on the total job amount, the job amount that is able to be processed until the selected at least one of the parts becomes unable to operate normally, and a job amount processed by the selected at least one of the parts per unit period of time;
determining a distribution method for distributing the input job among the plurality of apparatuses based on the evaluation value; and
transmitting over the computer network the input job to the plurality of apparatuses according to the determined distribution method.

15. A non-transitory computer-readable storage medium for storing instructions that, when executed, cause an information processing apparatus to perform a process comprising:
predicting, for at least one of a plurality of parts in a plurality of apparatuses, the apparatuses each capable of processing an input job and each communicably connected to the information processing apparatus over a computer network, a job amount that is able to be processed until the part becomes unable to operate normally;
selecting, based on the predicted job amount, at least one of the parts to be replaced at a scheduled maintenance timing from among the at least one of the plurality of parts;
predicting a total job amount to be processed by the plurality of apparatuses up to the scheduled maintenance timing on a basis of a job amount processed in the past by each of the plurality of apparatuses and on a basis of a period of time left until the scheduled maintenance timing;
calculating an evaluation value based on the total job amount, the job amount that is able to be processed until the selected at least one of the parts becomes unable to operate normally, and a job amount processed by the selected at least one of the parts per unit period of time;
determining a distribution method for distributing the input job among the plurality of apparatuses based on the evaluation value; and
transmitting over the computer network the input job to the plurality of apparatuses according to the determined distribution method.

16. An information processing apparatus comprising:
one or more processors; and
one or more memories storing instructions that, when executed by the one or more processors, cause the information processing apparatus to perform operations comprising:
predicting for at least one of a plurality of parts in a plurality of apparatuses, the apparatuses each capable of processing an input job and each communicably connected to the information processing apparatus over a computer network, a job amount that is able to be processed until the part becomes unable to operate normally;
predicting a total job amount to be processed by the plurality of apparatuses up to a next maintenance timing on a basis of a job amount processed in the past by each of the plurality of apparatuses and on a basis of a period of time left until the next maintenance timing;
calculating, at each of a plurality of scheduled maintenance timings, an evaluation value based on the total job amount, the job amount that is able to be processed until the selected at least one of the parts becomes unable to operate normally, and a job amount processed by the selected at least one of the parts per unit period of time;
determining a distribution method for distributing the input job among the plurality of apparatuses based on the evaluation value;
selecting, based on the determined distribution method, at least one of the parts to be replaced at the next maintenance timing out of the plurality of scheduled maintenance timings from among the at least one of the plurality of parts; and
transmitting over the computer network the input job to the plurality of apparatuses according to the determined distribution method.

17. An information processing method comprising:
predicting for at least one of a plurality of parts in a plurality of apparatuses, the apparatuses each capable of processing an input job and each communicably connected to the information processing apparatus over a computer network, a job amount that is able to be processed until the part becomes unable to operate normally;

predicting a total job amount to be processed by the plurality of apparatuses up to a next maintenance timing on a basis of a job amount processed in the past by each of the plurality of apparatuses and on a basis of a period of time left until the next maintenance timing;

calculating, at each of a plurality of scheduled maintenance timings, an evaluation value based on the total job amount, the job amount that is able to be processed until the selected at least one of the parts becomes unable to operate normally, and a job amount processed by the selected at least one of the parts per unit period of time;

determining a distribution method for distributing the input job among the plurality of apparatuses based on the evaluation value;

selecting, based on the determined distribution method, at least one of the parts to be replaced at the next maintenance timing out of the plurality of scheduled maintenance timings from among the at least one of the plurality of parts; and transmitting over the computer network the input job to the plurality of apparatuses according to the determined distribution method.

18. A non-transitory computer-readable storage medium for storing instructions that, when executed, cause an information processing apparatus to perform a process comprising:

predicting for at least one of a plurality of parts in a plurality of apparatuses, the apparatuses each capable of processing an input job and each communicably connected to the information processing apparatus over a computer network, a job amount that is able to be processed until the part becomes unable to operate normally;

predicting a total job amount to be processed by the plurality of apparatuses up to a next maintenance timing on a basis of a job amount processed in the past by each of the plurality of apparatuses and on a basis of a period of time left until the next maintenance timing;

calculating, at each of a plurality of scheduled maintenance timings, an evaluation value based on the total job amount, the job amount that is able to be processed until the selected at least one of the parts becomes unable to operate normally, and a job amount processed by the selected at least one of the parts per unit period of time;

determining a distribution method for distributing the input job among the plurality of apparatuses based on the evaluation value;

selecting, based on the determined distribution method, at least one of the parts to be replaced at the next maintenance timing out of the plurality of scheduled maintenance timings from among the at least one of the plurality of parts; and transmitting over the computer network the input job to the plurality of apparatuses according to the determined distribution method.

* * * * *